G. A. RICHARDSON.
BULL STAFF.
APPLICATION FILED MAY 26, 1910.
984,157.
Patented Feb. 14, 1911.
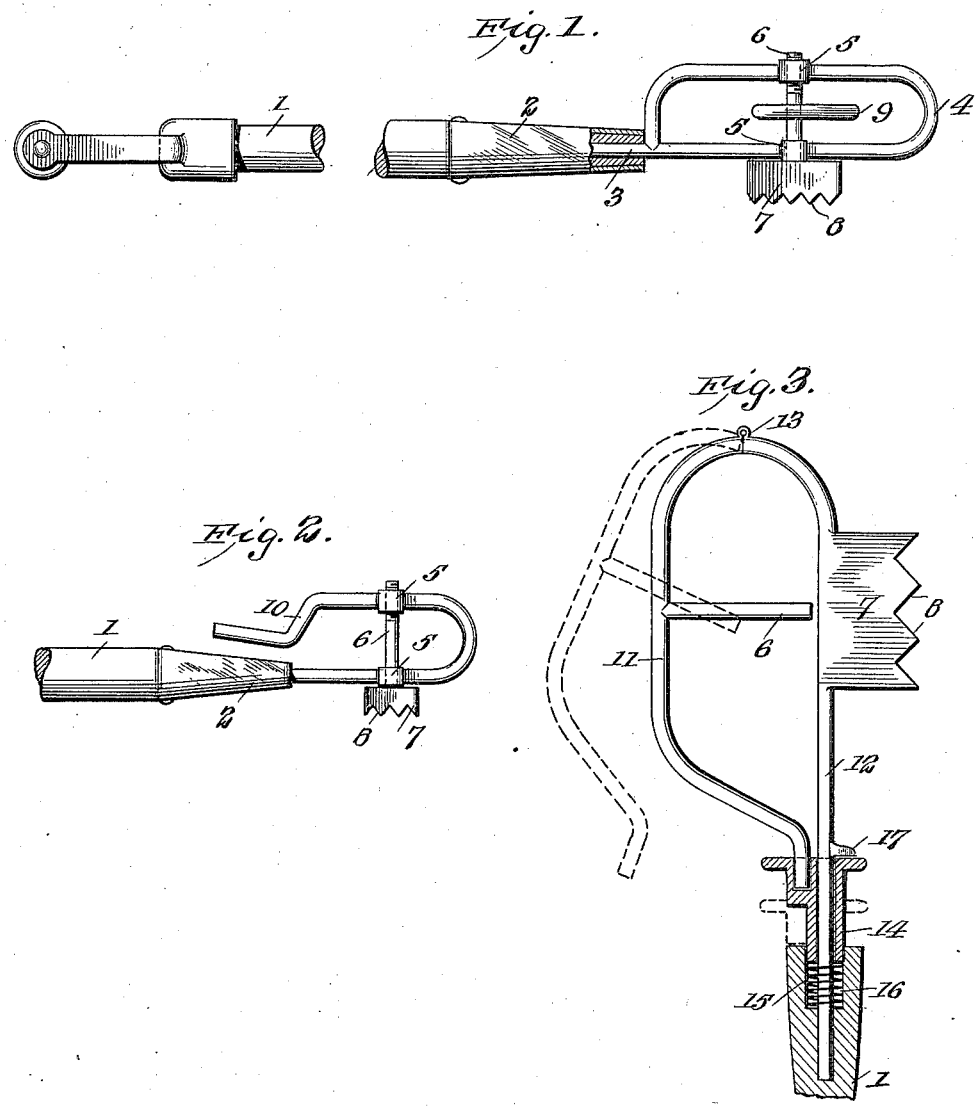
WITNESSES:
INVENTOR
GEORGE A. RICHARDSON
BY
William T. Jones
ATTORNEY

UNITED STATES PATENT OFFICE.

GEORGE A. RICHARDSON, OF EAST BARNET, VERMONT, ASSIGNOR OF ONE-HALF TO JOSEPH FAIRBANKS, OF ST. JOHNSBURY, VERMONT.

BULL-STAFF.

984,157.      Specification of Letters Patent.      Patented Feb. 14, 1911.

Application filed May 26, 1910. Serial No. 563,506.

*To all whom it may concern:*

Be it known that I, GEORGE A. RICHARDSON, a citizen of the United States, residing at East Barnet, in the county of Caledonia and State of Vermont, have invented new and useful Improvements in Bull-Staffs, of which the following is a specification.

My invention relates to improvements in what are commonly styled "bull staffs", and has for its object to provide a tethering device of this character which when attached to the nose-ring of the bull will serve not only as a means for leading the animal, but should the latter become unruly and obstinate, the device may be manipulated in such manner as to immediately and efficaciously place the animal under restraint.

To the accomplishment of the recited object and others coördinate therewith, the preferred embodiment of the invention resides in that construction and arrangement hereinafter described, illustrated in the accompanying drawings, and embraced within the scope of the appended claims.

In said drawings: Figure 1 is an elevation of the complete device, and Figs. 2 and 3 are modifications thereof.

Similar reference characters designate corresponding parts throughout the several views.

Referring particularly to Fig. 1 of the drawings for a detail description of my invention, the numeral 1 indicates the handle portion having at its outer end a suitable ferrule 2. Secured to said terminal is a shank 3, formed integral with a substantially oblong loop 4, the latter being enlarged laterally and centrally on opposite sides thereof, as at 5, and one of said enlargements, preferably the topmost, is equipped with a screw-threaded bore in order to detachably receive the correspondingly threaded stem 6 of the transversely disposed plate 7. This plate lies in the same plane with the loop and has its lower edge contiguous one side of the former, and the outer edge is serrated, as at 8.

In use the stem 6 is unscrewed from the loop and inserted through the nose-ring 9, whereupon the said stem is attached to the loop and occupies a position medially of the terminals of the same. With this arrangement the animal under normal conditions can be easily led. If on the other hand, the animal misbehaves the handle 1 is oscillated to bring the serrations 8 against the bridge of the nose of the beast, whereupon the latter will immediately desist, and at all times will be under the control of the attendant.

In Fig. 2 the loop 4 is provided with a lower free angular extremity, as 10, over which the nose-ring may be readily slipped.

As exhibited in Fig. 3, the loop is divided into sections 11 and 12 hingedly connected at the top at 13, and the stem 6 and the plate 7 are formed as a part of the respective sections whereby they are rendered separable. On the lower end of the section 12 is a vertically movable locking sleeve 14 which is normally constrained upwardly by the coil spring 15 seated concentrically of the ferrule in a recess 16 so that the sleeve will positively engage the free end of section 11. A projection 17 on the section 12 limits the movement of the sleeve 14 and thus prevents the same from working out of the ferrule. When it is desired to use this form of my invention, the locking sleeve is depressed until the section 11 is free to be swung outwardly, as clearly shown in dotted lines of Fig. 3, and it will appear manifest that a mere reversal will serve to fasten the nose-ring on the stem between the sections.

It should be understood that in its broader aspects my invention comprehends not only the employment of the means described, but of equivalent means for performing the recited functions.

While the arrangement is thought at the present time to be preferable, it is desired to reserve the right to effect such modifications and variations thereof as may come fairly within the scope of the appended claims.

What is claimed, is:

1. In a device of the character described, the combination of a handle having a loop on one end thereof, a stem extending transversely of the loop, and a plate lying in the plane of the loop and having its outer edge serrated.

2. In a device of the character described, the combination of a handle having a loop on one end thereof, a stem extending transversely of the loop and being movable from one side thereof, and a plate lying in the plane of the loop and having its outer edge serrated.

3. In a device of the character described, the combination of a handle having a loop on one end thereof, a stem extending transversely of the loop, and a plate having serrations on its outer edge, one terminal of said loop projecting into said handle and the other terminal being removed therefrom.

4. In a device of the character described, the combination of a loop comprising hinged sections, a stem carried by one section, a serrated plate mounted on the other section, and means for locking said sections against relative movement.

In testimony whereof I have hereunto set my hand in presence of two subscribing witnesses.

GEORGE A. RICHARDSON.

Witnesses:
JOSEPH FAIRBANKS,
JULIA M. CUTTING.